United States Patent
Dhyanchand et al.

[11] Patent Number: 5,177,460
[45] Date of Patent: Jan. 5, 1993

[54] SUMMING TRANSFORMER FOR STAR-DELTA INVERTER HAVING A SINGLE SECONDARY WINDING FOR EACH GROUP OF PRIMARY WINDINGS

[76] Inventors: P. John Dhyanchand, 2721 Pelham Rd., Rockford, Ill. 61107; Richard A. Arbanella, 1002 Kingsway Ave., Rockford, Ill. 61108; Raghunath G. Mokadam, 3724 Crosby St., Rockford, Ill. 61107

[21] Appl. No.: 460,997
[22] Filed: Jan. 4, 1990
[51] Int. Cl.⁵ .................. H01F 33/00; H01F 27/28
[52] U.S. Cl. .................. 336/12; 336/184; 336/212; 336/215; 363/43
[58] Field of Search .......... 336/5, 10, 12, 212, 336/215, 184, 147, 144, 182, 165; 363/154, 43, 72; 322/10

[56] References Cited

U.S. PATENT DOCUMENTS

| | | | |
|---|---|---|---|
| 2,644,109 | 6/1953 | Mulder | 336/5 |
| 3,221,280 | 11/1965 | Malsbary et al. | 336/5 |
| 3,241,048 | 3/1966 | Lee | 336/182 |
| 3,775,662 | 11/1973 | Compoly et al. | 321/5 |
| 4,112,403 | 9/1978 | Friedlander | 336/12 |
| 4,274,071 | 6/1981 | Pfarre | 336/12 |
| 4,634,958 | 1/1987 | Cornwell | 336/144 |
| 4,678,986 | 7/1987 | Barthelemy | 336/147 X |
| 4,947,100 | 8/1990 | Dhyachand et al. | 322/10 |
| 4,968,926 | 11/1990 | Dhyanchand | 322/10 |

FOREIGN PATENT DOCUMENTS

| | | | |
|---|---|---|---|
| 892183 | 10/1953 | Fed. Rep. of Germany | 336/5 |
| 922894 | 1/1955 | Fed. Rep. of Germany | 336/184 |
| 1044262 | 11/1958 | Fed. Rep. of Germany | 336/165 |
| 1065929 | 9/1959 | Fed. Rep. of Germany | 336/5 |
| 208247 | 4/1940 | Switzerland | 336/5 |

*Primary Examiner*—Thomas J. Kozma
*Attorney, Agent, or Firm*—Marshall, O'Toole, Gerstein, Murray & Bicknell

[57] ABSTRACT

A summing transformer for a star-delta inverter having a single secondary winding for each group of primary windings for use in inverting variable frequency AC power into constant frequency AC power, the transformer comprising a plurality of core elements having principal legs on which primary windings are wound and secondary legs extending from said principal legs establishing flux paths, the legs of each core element defining apertures through which a single winding is magnetically linked to a group of primary windings.

14 Claims, 3 Drawing Sheets

SUMMING TRANSFORMER FOR STAR-DELTA INVERTER HAVING A SINGLE SECONDARY WINDING FOR EACH GROUP OF PRIMARY WINDINGS

TECHNICAL FIELD

The present invention relates generally to a system for converting mechanical power developed by a prime mover into electrical power, and more particularly to the physical structure of a summing transformer used in a star-delta inverter having a single secondary winding for each group of primary windings.

BACKGROUND

In a power conversion system such as a variable speed, constant frequency (VSCF) power generating system, a generator converts variable speed motive power supplied by a prime mover into variable frequency AC power. The variable frequency power is rectified and provided over a DC link to a controllable inverter. The inverter, which comprises one or more subinverters and a summing transformer, is operated to produce constant frequency AC power, which is then supplied, over a load bus, to loads requiring such power. In various applications, such as an aircraft jet engine, the size and weight of the summing transformer used in such a system is extremely important.

The physical structure of a summing transformer for use in a VSCF system such as that described above must accommodate the specific electronic system that is intended to be used. One such electronic system is a star-delta system. An example of a star-delta system that may be used in an inverter in a VSCF system may be found in Dhyanchand, et al., U.S. patent applications Ser. Nos. 07/421,830, filed Oct. 16, 1989, entitled "Power Conversion System With Stepped Waveform DC/AC Converter Having Prime Mover Start Capability" and 07/426,444, filed Oct. 25, 1989, entitled "Power Conversion System with Stepped Waveform DC to AC Converter Having Prime Mover Start Capability". The star-delta systems of these applications include a 24-step inverter comprised of four subinverters and a summing transformer, and produce a 24-step, three-phase output. Each of the four subinverters is coupled to an associated set of three primary windings, which are carried on the summing transformer. Two of these associated sets of primary windings are connected in wye (or "star") configuration. The other two sets of primary windings are connected in delta configuration. The three-phase output is developed through magnetic linkage of three selected groups of primary windings with secondary windings also carried on the transformer. Each of the selected groups of primary windings comprises one primary winding from each of the four sets of primary windings. While in some electronic systems, such as that disclosed in Compoly, et al., U.S. Pat. No. 3,775,662, each group of primary windings is magnetically linked with four secondary windings, in the system disclosed in the Dhyanchand applications each such group is magnetically linked with a single secondary winding.

One problem faced by those skilled in the art has been to construct a transformer capable of accommodating the electronic system described in the Dhyanchand applications while meeting weight and size limitations critical in typical applications, such as in an aircraft jet engine.

SUMMARY OF THE INVENTION

The present invention, disclosed and claimed herein, comprises a summing transformer in which an electrical system including a set of secondary windings with a single winding for each group of primary windings is utilized in a relatively small and light structure.

A transformer of the present invention comprises a set of transformer core elements made of laminated iron. Each core element is comprised either of an individual shell core or of a pair of opposed E-cores. Each core element comprises three principal legs on which primary windings from one subinverter are wound. Secondary legs connect the principal legs to establish partially-shared flux paths through which magnetic flux associated with the primary windings can flow.

The legs of each core element are spaced to define apertures in each core element. The core elements in turn are arranged parallel to one another whereby each of the three primary windings on a core element is positioned adjacent a corresponding primary winding on an adjacent core element and apertures on adjacent core elements are substantially aligned. The spatial relationship of the primary windings on adjacent core elements thus groups the primary windings for magnetic linkage with the single secondary windings. Each single secondary winding is wound through the aligned apertures adjacent each of the groups of primary windings, placing each group of primary windings in magnetic connection with a single secondary winding.

BRIEF DESCRIPTION OF THE DRAWINGS

Further advantages of the invention will become apparent upon a reading of the following detailed description, taken in conjunction with the accompanying drawings, in which.

DESCRIPTION OF THE PREFERRED EMBODIMENT

Figure 1:
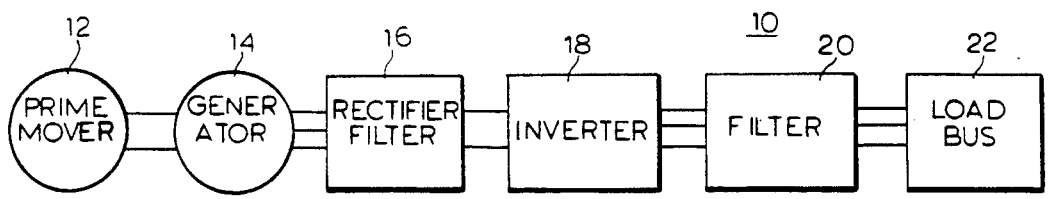
FIG. 1 shows a block diagram of a power generating system incorporating the summing transformer of the present invention.

Referring to FIG. 1, a power conversion system 10 in the form of a variable speed, constant frequency (VSCF) system operates to convert variable speed motive power produced by a prime mover 12, such as an aircraft jet engine, into constant frequency three-phase AC electrical power which is delivered to a load bus 22.

The variable speed motive power produced by prime mover 12 is converted by a generator 14 into 3-phase AC power. Preferably, generator 14 is a brushless, synchronous generator, although a different generator, such as a permanent magnet generator, may also be used. The 3-phase AC power produced by generator 14 is converted by a rectifier/filter 16 into DC power. The DC power is converted by an inverter 18 into constant frequency AC power, which is then delivered to an output filter 20 and subsequently to load bus 22.

Figure 2:
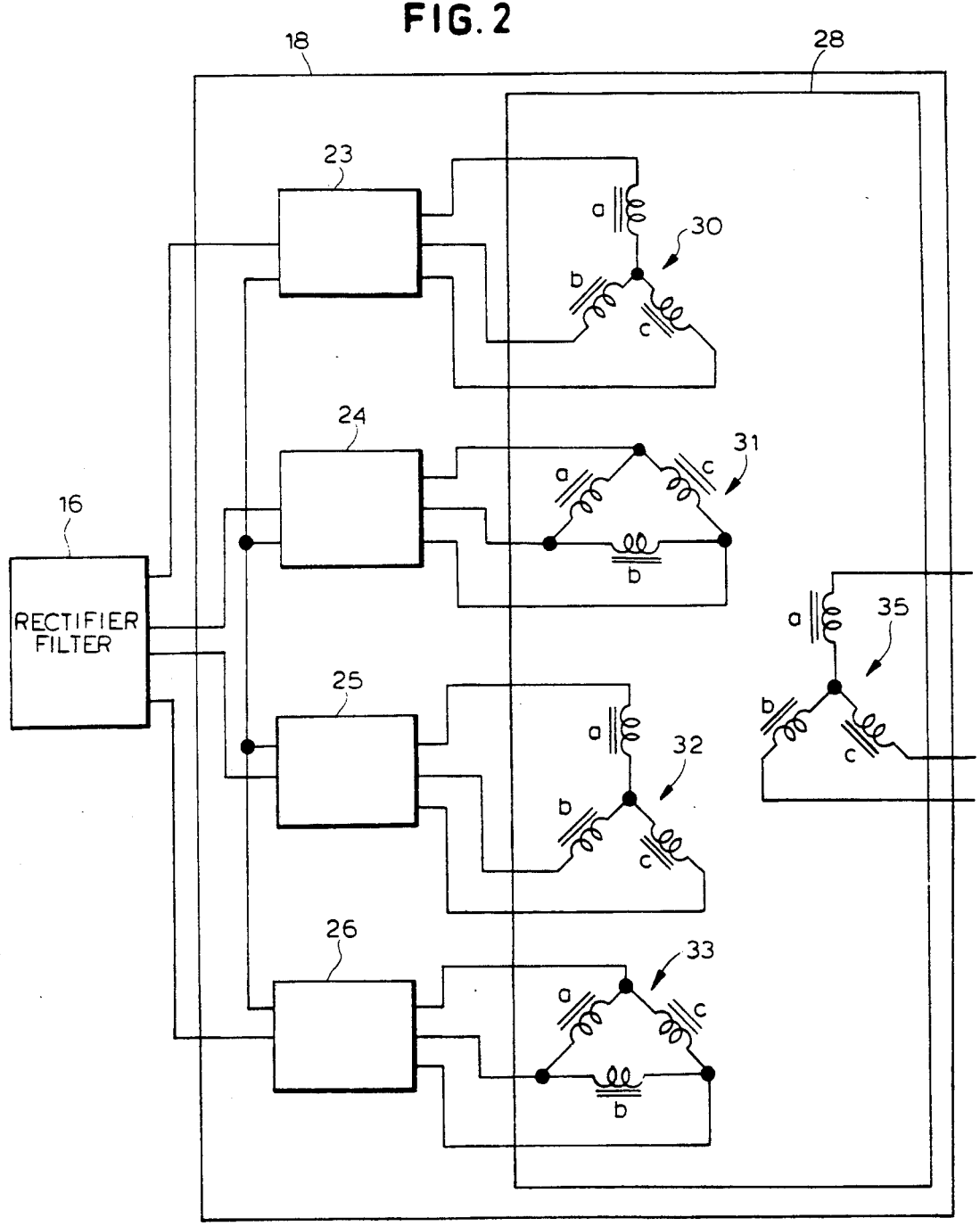
FIG. 2 shows a simplified schematic diagram of a star-delta electronic system having a set of single secondary windings, as used in the inverter of the power generating system shown in FIG. 1.

As seen in FIG. 2, inverter 18 comprises four three-phase subinverters 23, 24, 25, and 26 and a summing transformer 28. The outputs of rectifier/filter 16 are connected to inputs of subinverters 23, 24, 25, and 26. An output of first subinverter 23 is connected to a first set of primary windings 30 of summing transformer 28. In like fashion, outputs of subinverters 24, 25, and 26 are coupled to second through fourth sets of primary windings 31, 32, and 33, respectively. In the preferred embodiment, each of the first and third sets of primary windings 30, 32 includes three windings 30a-c and 32a-c connected in wye configuration. Each of the second and fourth sets of primary windings 31, 33 includes three windings 31a-c and 33a-c connected in delta configuration.

Primary windings 30a, 31a, 32a, and 33a are grouped together in magnetic linkage with a single secondary winding 35a of a set of secondary windings 35. Similarly, primary windings 30b, 31b, 32b, and 33b are grouped together in magnetic linkage with a single secondary winding 35b, and primary windings 30c, 31c, 32c, and 33c are grouped together in a magnetic linkage with a single secondary winding 35c. Secondary windings 35a-c are connected in wye configuration. The set of secondary windings 35 is in turn coupled to output filter 20 (FIG. 1).

Figure 3:
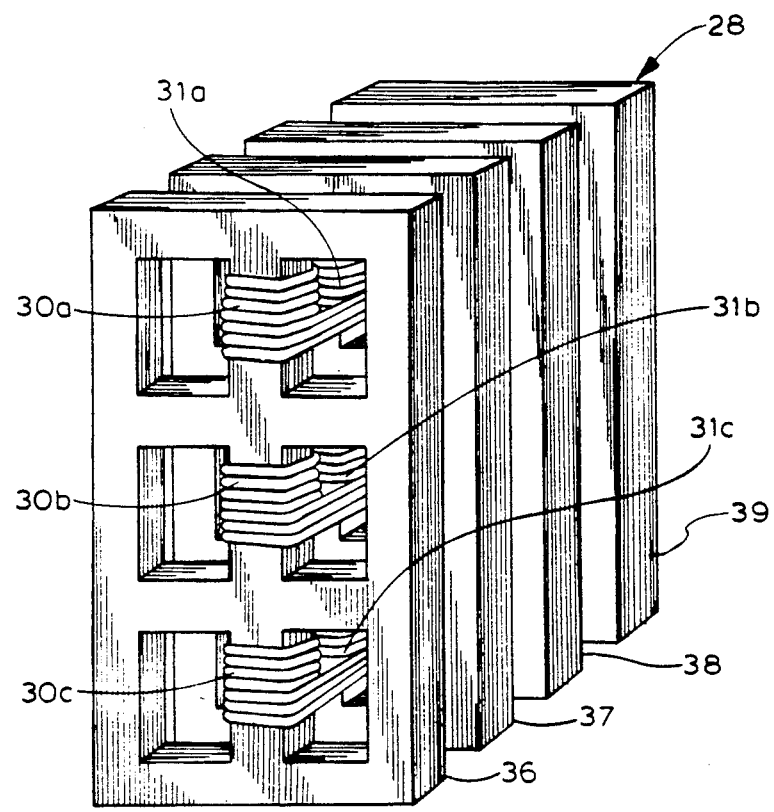
FIG. 3 shows a partial perspective of the physical structure of a summing transformer that accommodates the star-delta electronic system shown in FIG. 2, including a plurality of core elements in accordance with the present invention.

As seen in FIG. 3, primary windings 30a-c are each carried on a single core element 36 of summing transformer 28. Similarly, primary windings 31a-c, 32a-c, and 33a-c are carried on core elements 37, 38, and 39, respectively. Thus, summing transformer 28 comprises a separate core element for each set of primary windings, and thus for each subinverter.

Figure 4:
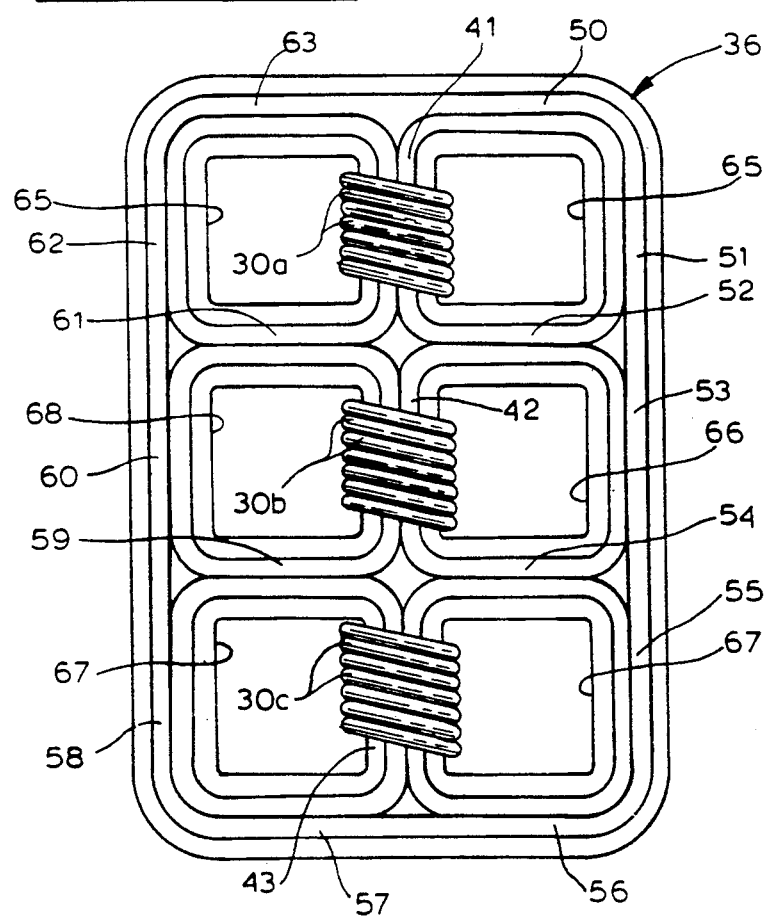
FIG. 4 shows an enlarged, detailed front view of one of the core elements of the summing transformer of FIG. 3.

Referring to FIG. 4, core element 36 is illustrated in partial detail and is shown as being constructed of laminated iron. As illustrated, core element 36 comprises a plurality of legs 41-43 and 50-63, all disposed on a common plane. Three of the legs, 41, 42, and 43, are principal legs, the term "principal leg", as used herein, meaning a leg on which a primary winding is carried. Principal leg 41 carries primary winding 30a, principal leg 42 carries primary winding 30b, and principal leg 43 carries primary winding 30c. Similarly, the principal legs on core elements 37, 38, and 39 carry primary windings 31a-c, 32a-c, and 33a-c, respectively.

Legs 50-63 on core element 36 are secondary legs, the term "secondary leg", as used herein, meaning a leg that does not carry a primary winding but that extends between bends or turns in the structure for establishing a continuous flux path. As seen in FIG. 4, secondary legs 50 and 63 are connected perpendicularly to one end of principal leg 41; secondary legs 52 and 61 are connected perpendicularly to a common end of principal legs 41 and 42; secondary legs 54 and 59 are connected perpendicularly to a common end of principal legs 42 and 43; and secondary legs 56 and 57 are connected perpendicularly to another end of principal leg 43. Secondary leg 51 is parallel to principal leg 41 and extends between ends of secondary legs 50 and 52 spaced from principal leg 41. Similarly, secondary legs 53, 55, 58, 60, and 62 connect ends of secondary legs 52 and 54, 54 and 56, 57 and 59, 59 and 61, and 61 and 63, respectively. The arrangement of the principal and secondary legs form continuous flux paths for the primary windings, allowing magnetic flux to flow when induced by current in an associated winding. Current flowing in primary winding 30a will thus induce flux to move in one flux path formed by legs 41 and 50-52, and in another flux path formed by legs 41 and 61-63. Similarly, current flowing in primary winding 30b or 30c will induce flux to move in paths formed by legs 42 and 52-54 and by legs 42 and 59-61; and in paths formed by legs 43 and 54-56 and by 43 and 57-59; respectively. The legs establishing these flux paths also define pairs of apertures 65, 66, and 67 associated with each primary winding.

In the embodiment of the invention shown in FIG. 4, core element 36 is illustrated as being formed by tape winding. In such an embodiment, multiple windings 80 of tape encircle each aperture of aperture pairs 65-67, and together form the shape of the core element shown in the figure.

Alternatively, core element 36 can be formed of a series of laminations stacked parallel to the front surface of the core element. In a core element having this alternative construction, each individual lamination includes all the legs and apertures shown in FIG. 4, but is relatively thin in depth. By combining multiple laminations, a core element formed by this method has a depth comparable to that of a core element formed by tape winding.

Figure 5:
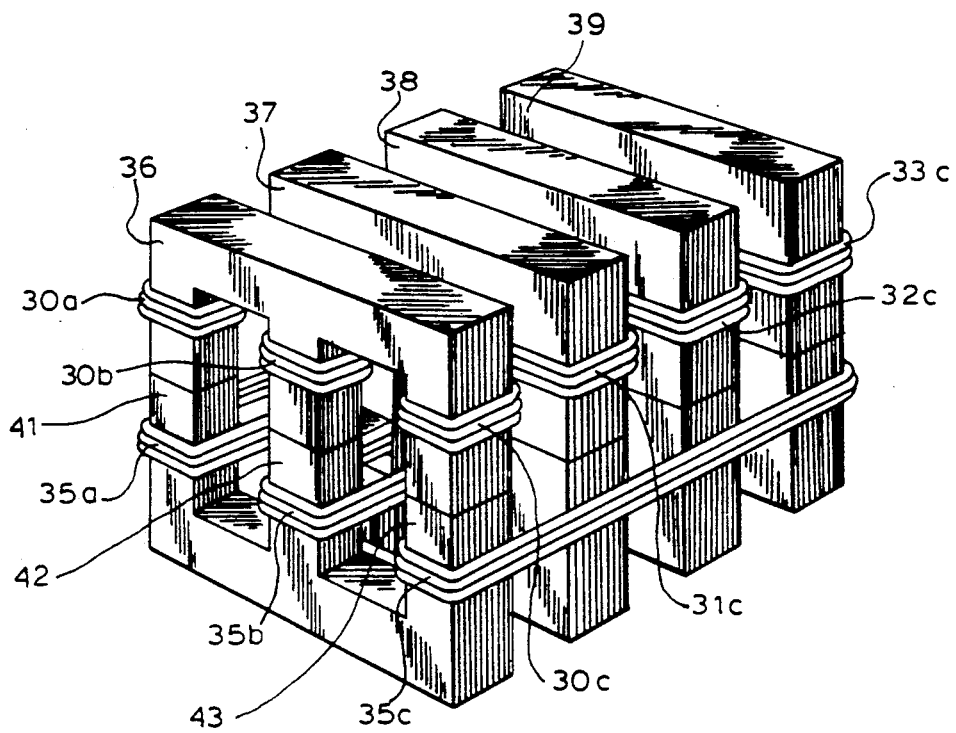
FIG. 5 shows a partial perspective of an alternate embodiment of a summing transformer in accordance with the present invention wherein each core element is comprised of two opposed E-cores.
Figure 6:
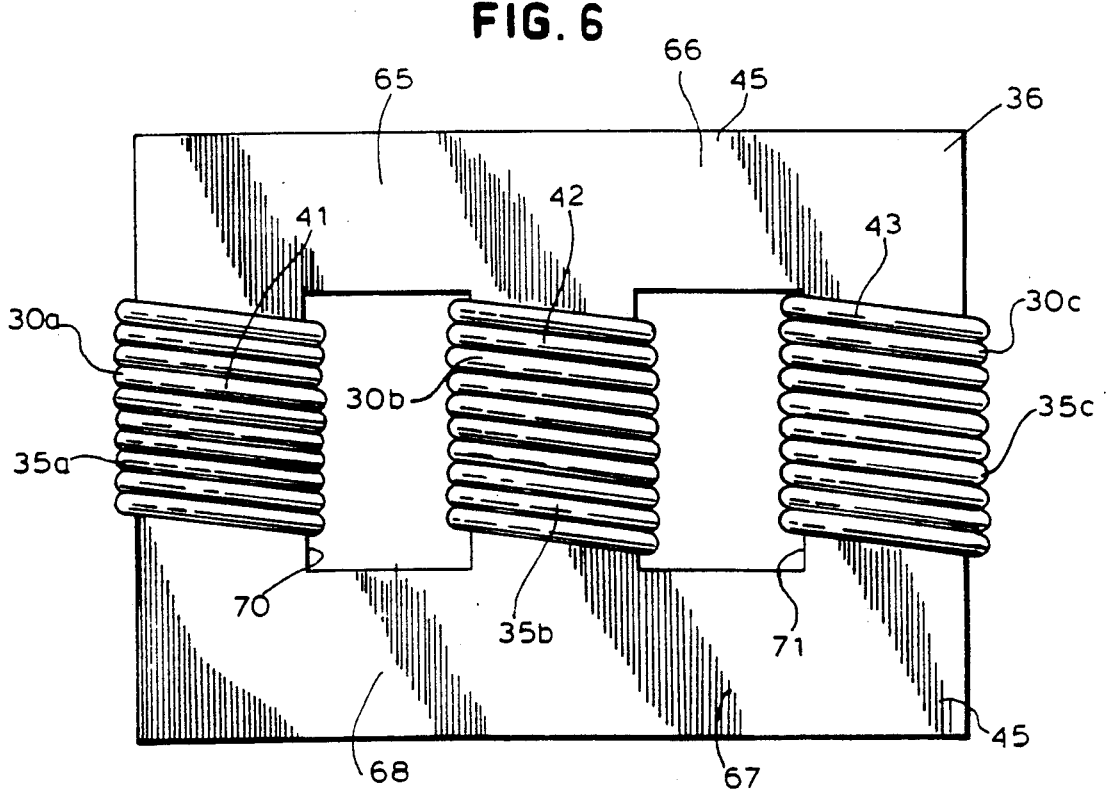
FIG. 6 shows an enlarged front view of one of the core elements of the summing transformer of FIG. 5.

A further alternate embodiment of core element 36 is shown in FIG. 5. In this particular embodiment, each core element 36-39 comprises two opposed E-cores. Opposite, open ends of each E-core are connected whereby they form parallel, interrupted principal legs 41, 42, and 43, around which primary windings 30a-c are wound, respectively. As seen in FIG. 6, additional secondary legs 65, 66, 67, and 68 extend perpendicularly to the spaced principal legs and establish flux paths through which magnetic flux can flow when induced by current in the primary windings. Thus, flux can flow through the path established by legs 41, 65, 42, and 68 when induced by current in either of primary windings 30a or 30b. In the same way, flux can flow through the path established by legs 42, 66, 43, and 67 when induced by current in either of primary windings 30b or 30c. The legs establishing these flux paths also define apertures 70 and 71.

In either embodiment of the core elements described above, the physical design characteristics of a particular leg is designed so it can accommodate, without saturation, the amount of flux that will move through that leg. A leg will saturate when the flux density, which is equal to the flux divided by the cross-sectional area of the leg, exceeds the saturation flux density for the material out of which the leg is constructed. To prevent saturation, either the cross-sectional area of the leg can be increased or the leg can be constructed of a material having a higher saturation flux density.

In both the embodiment of the invention shown in FIGS. 3 and 4 and in the embodiment shown in FIGS. 5 and 6, core elements 36-39 are arranged consecutively, with principal legs 41 and primary windings 30a, 31a, 32a, and 33a grouped in a first row, principal legs 42 and primary windings 30b, 31b, 32b, and 33b grouped in a second row, and principal legs 43 and primary windings 30c, 31c, 32c, and 33c grouped in a third row. A single secondary winding 35a winds around the sides of the group of principal legs 41 of each of core elements 36, 37, 38, and 39. (The secondary windings have not been shown in FIGS. 3 and 4.) Similarly, a single secondary winding 35b winds around the group of principal legs 42 of each core element, and single secondary 35c winds around the group of principal legs 43 of each core element.

Although the primary and secondary windings have been shown in the drawings next to each other, to minimize leakage reactance it is beneficial to wind the secondary windings over the top of the primary windings.

In the embodiment of the invention shown in FIGS. 3 and 4, principal legs 41-43 of core element 36 are disposed in a single line. Similarly, principal legs 41-43 of core elements 37 and 38 are also disposed on single lines. The four lines on which the principal legs of the four core elements are disposed are parallel to one another, and form a plane that divides each of the core elements into two sides. Secondary winding 35a passes through aperture pairs 65 on each side of the core elements, secondary winding 35b passes through aperture pairs 66 on each side of the core elements, and secondary winding 35c passes through aperture pairs 67 on each side of the core elements.

In the embodiment of the invention shown in FIGS. 5 and 6, principal legs 41-43 of core element 36 are parallel to one another. Similarly, principal legs 41-43 of core elements 37-39 are also parallel to one another. The four principal legs 42 of the four core elements are all disposed on a plane that traverses each of core elements 36-39. Similarly, the four principal legs 41 and the four principal legs 43 are each disposed on planes spaced from and parallel to the plane that divides the core elements. Secondary winding 35a passes through aperture 70 on one side of principal legs 41 and on the outside of core elements 36-39 on the other side of those legs. Secondary winding 35b passes through aperture 70 on one side of legs 42 and through aperture 71 on the other side of those legs. Secondary winding 35c passes through aperture 71 on one side of legs 3 and on the outside of core elements 36-39 on the other side of those legs.

As previously discussed, secondary windings 35a-c are connected in wye configuration, as shown in FIG. 2, with the output connected to filter 20, as shown in FIG. 1.

It should be noted that the summing transformer of the present invention is not limited to use with a 24-step power conversion system. In fact, a 36-step inverter system which utilizes six subinverters or a system which uses a different number of subinverters may be used, if desired.

While one or more embodiments of the invention have been herein illustrated and described in detail, it will be understood that modifications and variations thereof may be effected without departing from the spirit of the invention and the scope of the appended claims.

We claim:

1. A summing transformer comprising:
   a plurality of spaced core elements, each core element comprising first, second, and third principal legs;
   a separate set of primary windings associated with each core element, each of the sets of primary windings consisting only of first, second, and third primary windings wrapped about the periphery of the first, second, and third principal legs, respectively, the primary windings in each set being connected directly to windings only from the associated core element and not directly to windings from other sets or other core elements;
   a first secondary winding wound about the first principal legs of the core elements;
   a second secondary winding wound about the second principal legs of the core elements; and
   a third secondary winding wound about the third principal legs of the core elements.

2. A summing transformer as recited in claim 1, wherein:
   the principal legs and secondary legs define apertures in each core element through which each of the primary windings are wrapped.

3. A summing transformer as recited in claim 2, wherein:
   apertures on each of the core elements are substantially aligned; and
   each of the secondary windings are wound through substantially aligned apertures in each of the core elements.

4. A summing transformer as recited in claim 3, wherein:
   all of said principal legs in a core element are aligned and arranged consecutively; and
   each of said principal legs in a core element is substantially aligned with principal legs in the other of said core elements.

5. A summing transformer as recited in claim 4, wherein:
   each of said core elements comprises a single set of primary windings;
   sets of primary windings on consecutive core elements are alternatingly connected in wye and delta configuration; and,
   said secondary windings are connected in wye configuration.

6. A summing transformer as recited in claim 5, wherein:
   said core elements are shell cores of laminated iron.

7. A summing transformer as recited in claim 5, wherein:
   said core elements are tape-wound cores of laminated iron.

8. A summing transformer as recited in claim 5, wherein:
   said summing transformer comprises four core elements for use in a 24-step power conversion system.

9. A summing transformer as recited in claim 3, wherein:
   all of said principal legs in a core element are spaced and arranged in parallel; and,
   each of said principal legs in a core element is substantially aligned with principal legs in the other of said core elements.

10. A summing transformer as recited in claim 1, wherein:
    sets of primary windings on consecutive core elements are alternatingly connected in wye and delta configuration; and
    the secondary windings are connected in wye configuration.

11. A summing transformer as recited in claim 10, wherein:

said core elements are comprised of opposed E-cores and said principal legs are interrupted.

12. A summing transformer as recited in claim 10, wherein:
the summing transformer comprises four core elements for use in a 24-step power conversion system.

13. A summing transformer comprising:
a plurality of spaced core elements, each core element comprising first, second, and third principal legs that are aligned linearly and two secondary legs that are aligned in parallel with said principal legs;
a set of primary windings for each core element, each of the sets of primary windings consisting of first, second, and third primary windings wrapped about the periphery of the first, second, and third principal legs, respectively, the primary windings being connected directly to one another and not directly to other windings;
a first secondary winding wound about the first principal legs of the core elements;
a second secondary winding wound about the second principal legs of the core elements; and
a third secondary winding wound about the third principal legs of the core elements.

14. A summing transformer comprising:
a plurality of spaced core elements, each of the core elements comprising first, second, and third principal legs that are aligned linearly, connection points between the linearly-aligned principal legs;
two secondary legs that are disposed at right angles to the principal legs at each of the connection points,
and a secondary leg that is aligned in parallel with each of the principal legs;
a set of primary windings for each core element, each of the sets of primary windings consisting of first, second, and third primary windings wrapped about the periphery of the first, second and third principal legs, respectively, the primary windings being connected directly to one another and not directly to other windings;
a first secondary winding wound about the first principal legs of the core elements;
a second secondary winding wound about the second principal legs of the cores elements; and
a third secondary winding wound about the third principal legs of the core elements.

* * * * *